United States Patent [19]
Galisz et al.

[11] 3,848,523
[45] Nov. 19, 1974

[54] ROTARY BARBECUE DEVICE

[76] Inventors: Laszlo Galisz, 147 Huston St., Sherman Oaks, Calif. 91403; Miklos Vali, 5723 Harold Way, Hollywood, Calif. 90028

[22] Filed: May 29, 1973

[21] Appl. No.: 364,862

[52] U.S. Cl.................... 99/421 H, 99/419, 99/420, 126/25
[51] Int. Cl. ............................................ A47j 37/04
[58] Field of Search ............. 99/421, 419, 420, 443; 126/25

[56] References Cited
UNITED STATES PATENTS

| | | | |
|---|---|---|---|
| 2,577,963 | 12/1951 | Hagopian.................. | 99/421 HH X |
| 3,017,819 | 1/1962 | Manteris........................ | 99/421 HH |
| 3,125,015 | 3/1964 | Schlaegel........................ | 99/421 P |
| 3,309,982 | 3/1967 | Surks..................... | 99/420 |

Primary Examiner—Robert L. Bleutge
Assistant Examiner—Arthur O. Henderson
Attorney, Agent, or Firm—Donald Diamond

[57] ABSTRACT

A rotary barbecue device is provided which includes a housing and a plurality of hollow, mutually rotatable members horizontally disposed within the housing and extending outwardly from the housing; one of the hollow rotatable members is a driving member and the other hollow rotatable members are driven members, with the hollow driving member being adapted to cooperatively engage and rotate with a motorized barbecue spit and the hollow driven members being adapted to cooperatively engage and rotate food carrying skewers.

10 Claims, 6 Drawing Figures

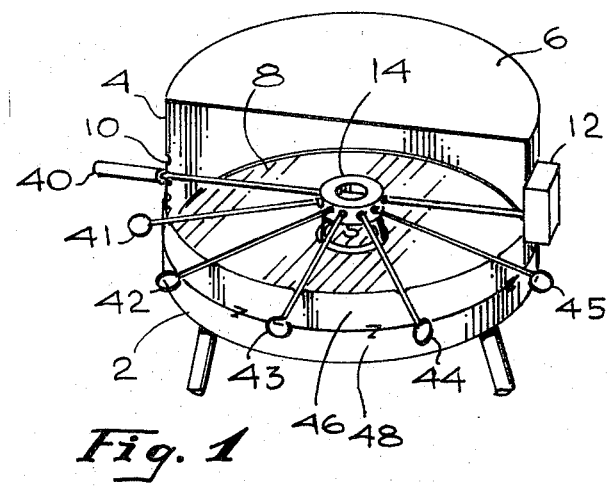
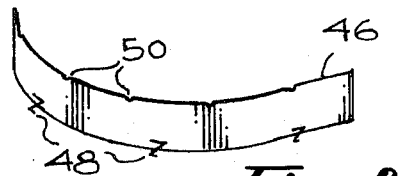
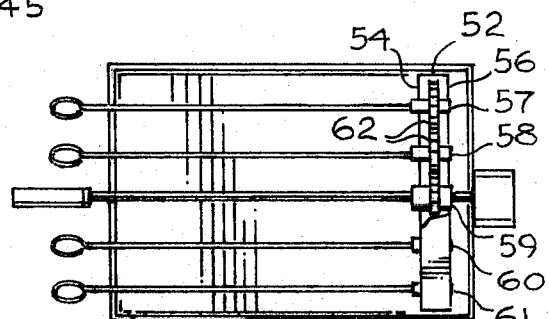
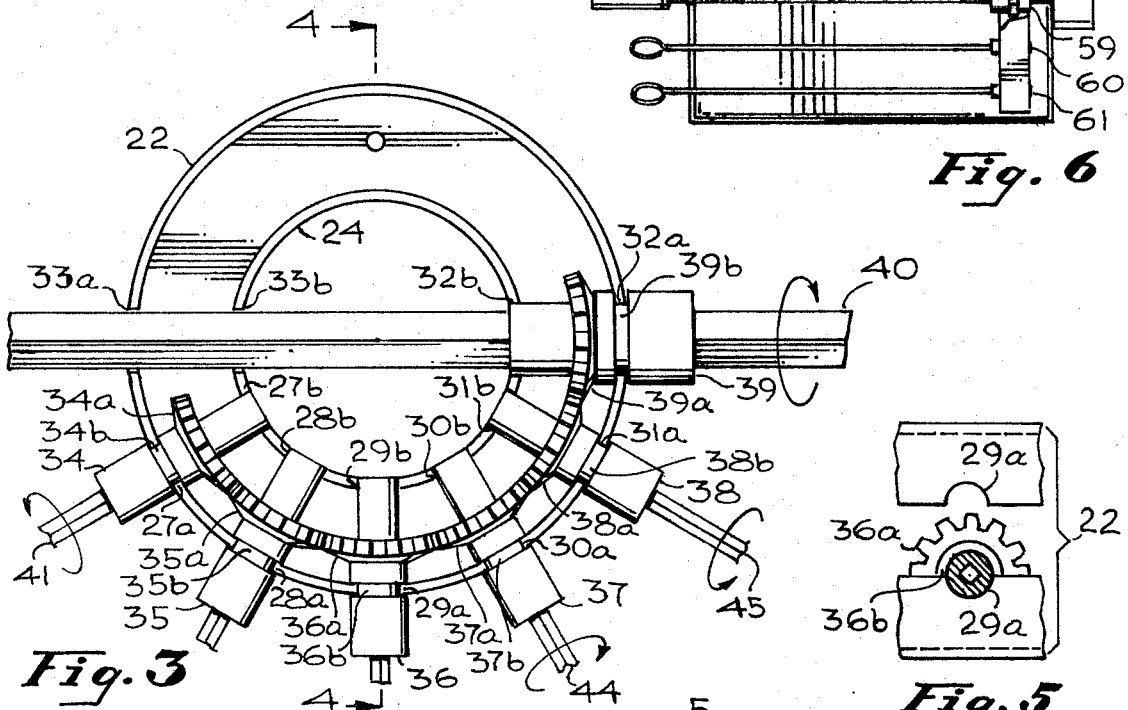
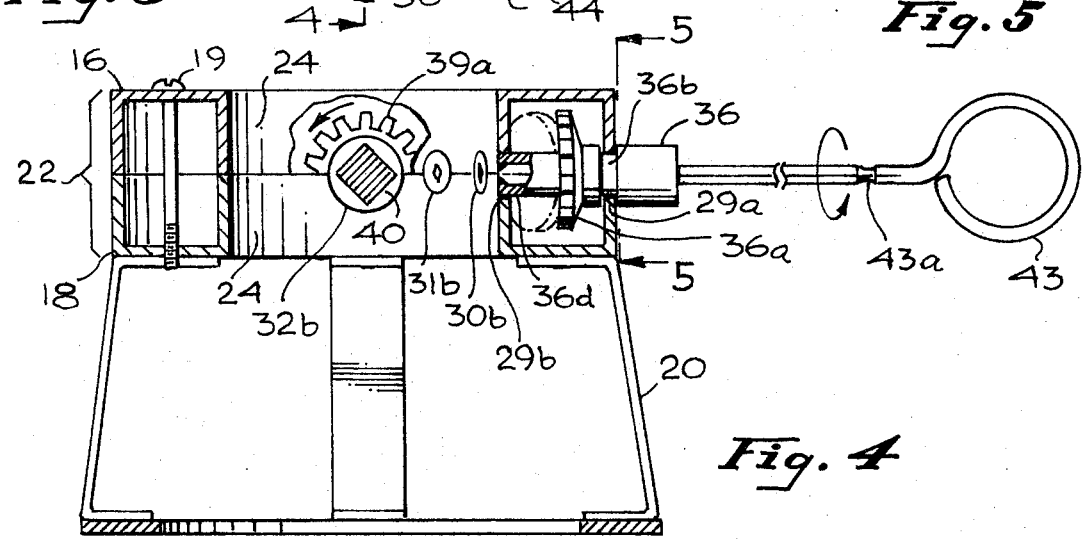

ROTARY BARBECUE DEVICE

BACKGROUND OF THE INVENTION

This invention relates to barbecue devices and, more particularly, to a rotary barbecue device especially adapted to support and rotate a plurality of food carrying skewers on their longitudinal axes over the heating and cooking area of a barbecue bowl or heating bed.

A typical, non-commercial barbecue, comprises a cylindrically or rectangularly shaped heating bowl mounted on a support stand and provided with a food supporting grill. In addition, the barbecue usually includes, as an accessory, a spit and motor assembly which is appropriately supported and positioned by the barbecue unit. The heat source may be charcoal, natural or bottled gas, or an electric heating element.

It has heretofore been common practice for the householder to prepare barbecued shish kebob by inserting the appropriate meat and vegetable items onto a skewer and placing the skewer on the grill of a heated barbecue bowl. The skewer is partially rotated from time-to-time in order to provide uniform heating and cooking of the shish kebob. Frankfurters, like shish kebob, may be inserted onto skewers and the skewers placed on the barbecue grill or the frankfurters may be placed directly on the grill. In either case, the frankfurters are partially rotated from time-to-time in order to effect suitable heating prior to consumption.

It would, of course, be advantageous and desirable to provide an uncomplicated and inexpensive accessory for use with barbecue devices which would automatically rotate food carrying skewers and, thus, eliminate the necesity of constant watching and manual rotation of the skewers when barbecuing such food items as shish kebob and frankfurters.

PRIOR ART

A wide variety of rotary cooking devices have been illustrated and described in the prior art. See, for example, U.S. Pat. No. 3,309,982 (Surks, 1967); U.S. Pat. No. 2,710,575 (Overman, 1955); U.S. Pat. No. 2,556,808 (Harris, 1951); and U.S. Pat. No. 2,040,016 (Sanders, 1936).

OBJECTS

An object of this invention is to provide a rotary barbecue device which is adapted to rotate a plurality of food skewers in conjunction with the rotation of a barbecue spit and motor assembly.

Another object of this invention is to provide a rotary barbecue device having a plurality of hollow, mutually rotatable members wherein one of the hollow, rotatable members is a driving member and the other hollow rotatable members are driven members with the hollow driving member being adapted to cooperatively engage and rotate with a motorized barbecue spit and the hollow driven members being adapted to cooperatively engage and rotate food holding skewers on their longitudinal axes.

A further object of this invention is to provide a rotary barbecue device of the character described wherein the hollow, mutually rotatable members comprise a gear train.

A still further object of this invention is to provide a rotary barbecue device of the character described wherein the gear shafts of the gear train are radially disposed and the gear teeth on the gear shafts have an arcuate configuration.

Yet another object of this invention is to provide a rotary barbecue device of the character described wherein the gear shafts of the gear train are substantially in parallel alignment and the gear teeth on the gear shafts are substantially in linear alignment.

SUMMARY OF THE INVENTION

In accordance with this invention, there is provided a barbecue rotary device which includes a housing having a plurality of hollow, mutually rotatable members disposed within the housing and extending outwardly from the housing; one of the hollow, rotatable members is a driving member and the other hollow rotatable members are driven members, with the hollow driving member being adapted to cooperatively engage and rotate with a motorized barbecue spit and the hollow driven members being adapted to cooperatively engage and rotate food holding skewers in response to and in conjucntion with the rotation of the spit.

In one embodiment, the housing is in the form of a spheroidal tube and the hollow, mutually rotatable members comprise an arcuately disposed gear train. In another embodiment, the housing is in the form of a substantially linear tube and the hollow, mutually rotatable members comprise a linearly disposed gear train.

DESCRIPTION OF THE DRAWINGS

FIG. 1 is a perspective view of the barbecue rotary device disposed on the grill of a barbecue structure and is shown in combination with a motorized barbecue spit and a plurality of skewers together with a skewer support member.

FIG. 2 is an enlarged view of the skewer support member.

FIG. 3 is an exploded top view of the rotary barbecue device, with the top portion of the housing removed, showing the arcuate configuration of the gear train.

FIG. 4 is a vertical section along line 4—4 of FIG. 3.

FIG. 5 is a sectional view along line 5—5 of FIG. 4 showing the groove and rim arrangement for defining and maintaining the alignment between the gear train and the housing.

FIG. 6 is a perspective view of an alternative embodiment of the rotary barbecue device, with a portion of the housing removed, showing the gear train in linear alignment.

DETAILED DESCRIPTION

Referring now to the drawings and, in particular, to FIG. 1, there is shown a barbecue structure comprising a cylindrically shaped barbecue bowl 2 having a hemispherical side wall 4, a hemispherical top wall 6 and a grill 8. One end of the side wall is provided with a plurality of vertically disposed, barbecue spit support grooves 10 and the other end of the side wall is provided with a barbecue spit motor 12 which can be selectively positioned so as to place it in horizontal alignment with a specific support groove.

A rotary barbecue device is positioned on the barbecue grill. The device includes a housing in the form of a spheroidal tube 14. As shown in FIG. 4, the housing comprises an upper portion 16 and a lower portion 18 with the upper portion being removably secured to the lower portion by, for example, threaded fasteners 19. The bottom side of the lower portion of the housing is attached to a support stand 20 which sits on the barbecue grill.

The housing has an outer side wall 22 and an inner side wall 24 with the immediately adjacent outer and inner side walls having a plurality of horizontally aligned, cylindrical openings 27a, 27b; 28a, 28b; 29a, 29b; 30a, 30b; 31a, 31b; 32a, 32b; 33a, 33b. The openings may advantageously be provided by mating grooves in the outer and inner side wall rims of the upper and lower portions of the housing as shown in FIG. 4 and in FIG. 5. The longitudinal axes of the openings are substantially on radii to the vertical, central axis of the tubular housing. The opening 32a, 32b is substantially in diametric alignment with the opening 33a, 33b.

The openings, except for opening 33a, 33b, position and rotatably support hollow, mutually rotatable members 34, 35, 36, 37, 38, 39 which extend outwardly from the housing. Rotatable member 39 is a driving member and the other rotatable members are driven members.

The hollow, mutually rotatable members comprise a gear train with each member thereof having a hollow gear shaft and a plurality of gear teeth 34a, 35a, 36a, 37a, 38a, 39a circumferentially disposed about the gear shaft with the location of the gear teeth on the gear shaft being within the housing. As shown in FIG. 3, the gear teeth are arcuately disposed on the gear shafts to substantially conform with the curvature of the side walls of the spheroidal housing.

Eash gear shaft is provided with means which cooperate with the housing for defining and maintaining the alignment between the gear shaft and the housing. These means advantageously take the form of circumferential grooves 34b, 35b, 36b, 37b, 38b, 39b, in the outer surface of the gear shafts which rotatably engage the rims of the openings in the outer side wall of the housing.

The hollow shaft of the driving member 39 of the gear train is adapted to cooperatively engage and rotate with a motorized barbecue spit 40 and the hollow shafts of the driven members 34, 35, 36, 37, 38, of the gear train are adapted to cooperatively engage and rotate food holding skewers 41, 42, 43, 44, 45. Since the barbecue spit rod and the skewer rods are rectangular, the hollow shafts of the members of the gear train are provided with corresponding rectangular configurations. Also, the inner end of the hollow gear shaft of each driven member of the gear train is, advantageously, of reduced cross-sectional area so as to frictionally engage a food holding skewer, as illustrated at 36d.

A yieldable, skewer rod support sheet 46 may be used in combination with the rotary barbecue device. The support sheet is provided with a plurality of attachment members 48 along its lower end for vertically attaching the sheet to the rim of the barbecue bowl 2. The upper end of the support sheet is provided with a plurality of spaced grooves 50 for rotatably supporting food holding skewers. The spaced grooves are substantially in alignment with the hollow gear shafts of the driven members and the outer end portions of the skewers may be provided with circumferentially rounded sections for rotatably engaging the grooves, as illustrated at 43a, In using the rotary barbecue device, the barbecue spit rod 40 is inserted through the hollow shaft of the driving member 39 of the gear train and through the opening 33a, 33b in the opposite side walls of the housing into engagement with the spit holder of the barbecue motor 12. The end of the spit rod adjacent to the spit handle is placed in the barbecue side wall groove 10. Shish kebob, frankfurters or the like are placed on the food holding skewers 41, 42, 43, 44, 45 and the ends of the skewers are inserted into the hollow gear shafts of the driven members of the gear train. The energizing of the barbecue motor rotates the spit with the concomitant rotation of the entire gear train whereby the food holding skewers are slowly rotated on their longitudinal axes over the cooking and heating area of the barbecue bowl until the food items have been suitably prepared for consumption.

In an alternative embodiment, as shown in FIG. 6, the housing 52 is in the form of a linear tube. Oppositely disposed side walls 54, 56 of the housing are provided with a plurality of horizontally aligned openings for positioning and supporting the hollow, mutually rotatable members 57, 58, 59, 60, 61 in substantially parallel alignment.

The mutually rotatable members comprise a gear train with each member thereof having a hollow gear shaft and a plurality of gear teeth circumferentially disposed about the gear shaft with the location of the gear teeth on the gear shaft being within the housing. The gear teeth on the gear shaft are in linear alignment 62 and the outer surface of each gear shaft is provided with a circumferential groove for rotatably engaging the rim of the opening in the side wall 54 of the housing.

While in the foregoing description and accompanying drawing there has been shown and described the preferred embodiment of this invention, it will be understood, of course, that minor changes may be made in the detail of construction as well as in the combination and arrangement of parts without departing from the spirit and scope of the invention as claimed.

That which is claimed is:

1. A portable, rotary barbecue attachment device for use with and actuation by a motorized barbecue spit comprising:

a housing; and a plurality of hollow, mutually rotatable members horizontally disposed within said housing and extending outwardly of said housing; one of said hollow rotatable members being a driving member and the other hollow rotatable members being driven members, said hollow driving member being adapted to cooperatively engage and to be rotated by said motorized barbecue spit and the hollow driven members being adapted to cooperatively engage and rotate food holding skewers.

2. A device according to claim 1 wherein said housing is a spheroidal tube having an outer side wall and an inner side wall with the immediately adjacent outer and inner side walls having a plurality of horizontally aligned openings for positioning and supporting said rotatable members, with the longitudinal axes of said openings being substantially on radii to the vertical, central axis of said spheroidal tube; and one of said openings being adapted to accommodate said rotatable driving member and being in substantially diametric alignment with horizontally aligned openings in the oppositely disposed, adjacent side walls of said spheroidal tube for rotatably supporting the motorized spit.

3. A device according to claim 2 wherein the hollow, mutually rotatable members comprise a gear train with each member thereof having a hollow gear shaft and a plurality of gear teeth circumferentially disposed about said gear shaft with the location of said gear teeth on said gear shaft being within said housing, said gear teeth being arcuately disposed to substantially conform with the curvature of the side walls of the housing, and each gear shaft including means cooperating with said housing for defining and maintaining alignment between said gear shaft and said housing.

4. A device according to claim 3 wherein the means for defining and maintaining alignment between said gear shaft and said housing includes a circumferential groove in the outer surface of the gear shaft which rotatably engages the rim of the opening in at least one side wall of said housing.

5. A device according to claim 4 wherein the hollow gear shaft of each driven member includes an outer end and an inner end, with the inner end being of reduced cross-sectional area so as to frictionally engage a food holding skewer.

6. A device according to claim 5 wherein said housing is mounted on a support stand.

7. A device according to claim 6 which includes, in combination, a yieldable support sheet having an upper end and a lower end, said lower end being provided with a plurality of attachment members for vertically attaching said support sheet to the rim of a barbecue bowl and said upper end being provided with a plurality of spaced grooves for rotatably supporting food holding skewers.

8. A device according to claim 7 which includes, in combination, a plurality of holding skewers, each of said skewers having an inner end portion and a outer end portion, said inner end portion being adapted to engage the hollow shaft of the driven member and the outer end portion being provided with a circumferentially rounded section for rotatably engaging a groove in the upper end of the support sheet.

9. A device according to claim 1 wherein said housing is a linear tube having first and second oppositely disposed side walls with said oppositely disposed side walls being provided with a plurality of horizontally aligned openings for positioning and supporting said rotatable members in substantially parallel alignment.

10. A device according to claim 9 wherein the hollow, mutually rotatable members comprise a gear train with each member thereof having a hollow gear shaft and a plurality of gear teeth circumferentially disposed about said gear shaft with the location of said gear teeth on said gear shaft being within said housing, said gear teeth on said gear shafts being in substantially linear alignment, and each gear shaft being provided with a circumferential groove for rotatably engaging the rim of the opening in at least one of said oppositely disposed side walls of said housing.

* * * * *